Fig. 1.

June 18, 1963  K. B. BREDTSCHNEIDER ETAL  3,094,136
LUBRICATED PLUG VALVE
Filed Dec. 2, 1959  7 Sheets-Sheet 2

Inventors.
Kurt B. Bredtschneider,
Edmond P. DeCraene,
George E. Hansen, &
Frank D. Cotterman.
By Joseph O. Lange
Atty.

June 18, 1963  K. B. BREDTSCHNEIDER ETAL  3,094,136
LUBRICATED PLUG VALVE
Filed Dec. 2, 1959  7 Sheets-Sheet 3

Inventors.
Kurt B. Bredtschneider,
Edmond P. DeCraene,
George E. Hansen, &
Frank D. Cotterman.
By Joseph O. Lange, Atty.

United States Patent Office 3,094,136
Patented June 18, 1963

3,094,136
LUBRICATED PLUG VALVE
Kurt B. Bredtschneider, Chicago, Edmond P. De Craene, Westchester, George E. Hansen, Elmwood Park, and Frank D. Cotterman, La Grange, Ill., assignors to Crane Co., Chicago, Ill., a corporation of Illinois
Filed Dec. 2, 1959, Ser. No. 856,817
2 Claims. (Cl. 137—246.11)

This invention relates generally to plug valves and, more particularly, is directed to a combined lubricated and packed type of valve structure especially suitable for extremely high temperature and fluid pressure services under a wide variety of severe flow control conditions.

One of the objects of this invention is to provide for a plug valve in which the balanced tapered plug or frusto-conical closure member, preferably of the lubricated type, is disposed within the valve casing or body with the large end thereof positioned toward the bonnet enclosed opening.

Another object is to provide for a plug valve in which the actuating stem and the adjusting nut for the rotatable tapered plug closure member may be sealed simultaneously.

Another important object is to provide for a valve construction in which the actuating stem is arranged so as to be separate from the valve plug and is prevented from substantial rotation relative to the latter member by a means of a suitable interlocking arrangement therebetween, such as a tongue and groove arrangement, for example.

A further important object is to provide for a lubricated plug valve in which the plug is held axially against its seat by means of the valve stem, the latter member having a shoulder on which there is preferably a thrust washer held in place by an adjusting nut.

Another object is to provide for a valve plug construction in which the adjusting nut hereinabove referred to co-operates with resilient means to retain the valve plug with a desired predetermined loading or bearing in the valve casing relative to its tapered contact with said casing.

A further object is to provide for a plug valve construction facilitating the use of a spring washer between the plug and the stem to permit slight axial movement of the plug upwards when the lubricant pressure or the like is applied between the plug and casing, thereby to force the plug away from or lift it from its seat.

Another object is to provide for an adjustment in which the valve plug adjusting nut can easily be adjusted and locked against further rotation.

A further object is to provide a plug valve in which the plug is of the floating type that is separated from the stem and in which the said plug is insertable through an opening from the top of the valve and thus overcoming the necessity for an additional opening in the body. Also, it should be appreciated that the prior removal of the plug from the bottom has required clearance space at the bottom of the pipeline which may be inconvenient in many cases.

A still further object is to provide for a plug valve construction in which the separated actuating stem is threadedly received within the adjusting nut whereby to predetermiately establish limits of axial movement of the valve plug in response to fluid pressure exerted by the introduction of the lubricant during valve operation.

Other objects and advantages of this invention will become more readily apparent upon proceeding with the description of it, read in light of the accompanying drawings, in which:

Similar reference numerals refer to similar parts throughout the several views.

Figure 1:
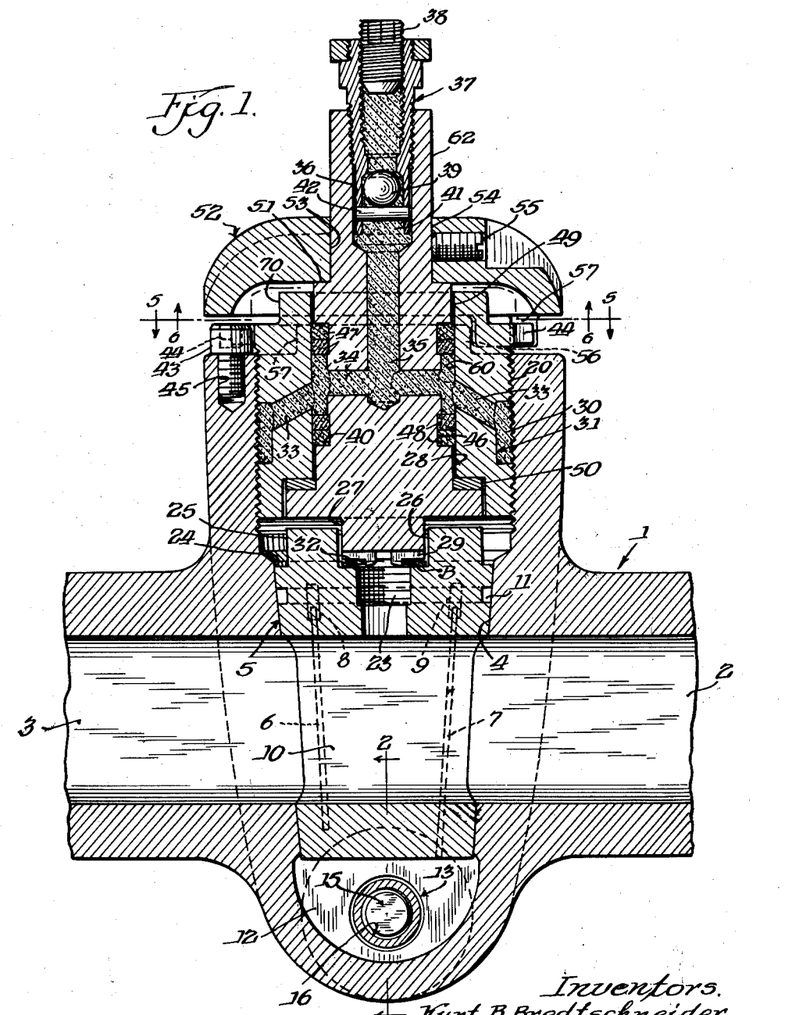
FIG. 1 is a fragmentary sectional assembly view of one form of a lubricated plug valve embodying our invention.

Referring now to FIG. 1, the valve body or casing 1 is provided with the usual through-ports 2 and 3 for attachment to a pipe line (not shown), which may obviously be welded, flanged, threaded or otherwise attached to the pipe line for which the valve control is desired. The valve body is provided with the annularly tapered or frusto-conical surface 4 to receive the valve plug or closure member generally designated 5. The latter member is provided with the usual lubricant grooves 6 and 7, which while here indicated as being on the outer surface of the plug, the said grooves may be applied instead to the body surface 4, if desired. In the illustrated embodiment, the body surface receiving the plug 5 is provided with the stub recesses 8 and 9 for completing the circulation of the lubricant around the plug periphery at the upper portion of the surface 4. In this connection, it will be noted that the said valve plug is provided with the annular groove 11 which by said connection with the stub recesses 8 and 9 thus serves to supplement the spread of the lubricant through bearing ducts 6 and 7, all of which aids in effecting the desirable functioning of the valve.

Figure 2:
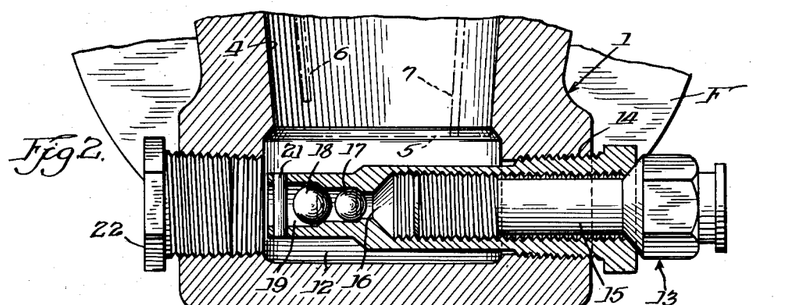
FIG. 2 is a fragmentary sectional view taken on the line 2—2 of FIG. 1.
Figure 3:
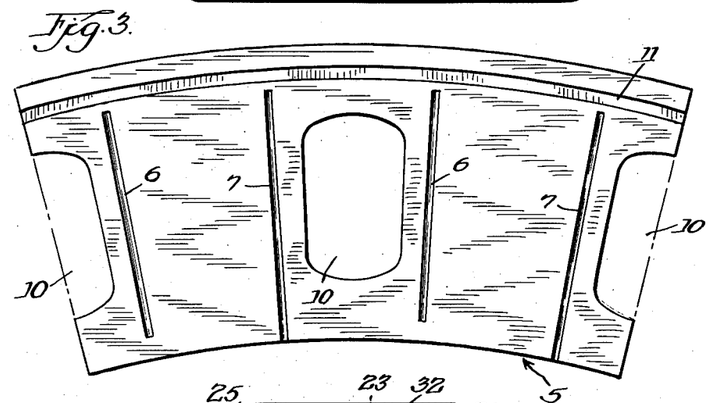
FIG. 3 is a developed view of the seating surface employed in the valve plug showing flow ports and lubricant ducts.
Figure 4:
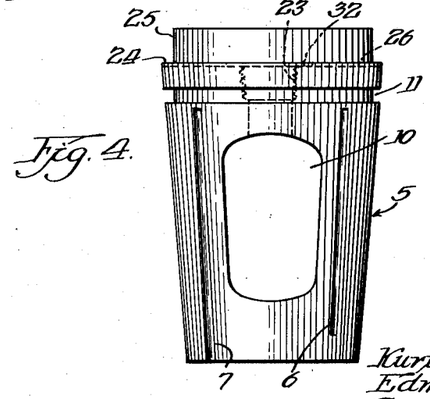
FIG. 4 is an outside view of a preferred embodiment of closure plug member employed.

Defining the limits of the frusto-conical surface 4 at the lower portion thereof, the valve body chamber 12 is provided which, as more clearly shown in FIG. 2, is fitted on an outer surface thereof with the pressure lubricant feeding mechanism such as the grease gun connection generally designated 13. The lower portion of the casing 1 extending radially of the chamber 12 is provided with the threads 14 for receiving the said lubricant feed mechanism. The latter, as customarily provided, is fitted with a threaded plunger 15 communicating with the inner chamber 16 and the ball check valves 17 and 18 as indicated for the usual purpose. The innermost end of the lubricator 13 beyond said ball check valves is open as at 19 to communicate with the chamber 12 and has the means for retaining the axially aligned check valves 17 and 18 in desired position through the transverse pin 21. At an opposite end portion to aid in flushing out the chamber 12, a removable threaded plug 22 is mounted as indicated and is preferably diametrically oppositely disposed from the lubricator 13 to facilitate such cleaning operation. The plug is fitted with the usual opening therethrough designated 10, coinciding with the through-ports 2 and 3 of the valve body when the valve is in the open position as illustrated in FIG. 1.

It will now be apparent that as the lubricator fitting 13 is charged with lubricant and the threaded plunger 15 is suitably rotated and moved inwardly on its threads, the lubricant such as a grease will be forced inwardly and in sufficient quantity to fill the chamber 12 to extend upwardly through the oppositely disposed grooves 13 and thence into the stub or short recesses 8 and 9, whereby to communicate with the annular chamber 11 on the plug, and thus effect the desired lubrication of plug 5. For purpose of removing the plug from the body 1, should it become necessary, the plug member is preferably tapped as at 23 to receive a suitable length of pipe by means of which the plug may easily be lifted upwardly and outwardly for either inspection, cleaning, repair or replacement.

Directing attention now to the upper portion of FIG. 1, the structural features constituting the principal elements of this invention are shown. They lie particularly in the methods and structures provided for sealing the operating stem and an adjusting bushing therefor as will hereinafter become more readily apparent.

Directing further attention to FIG. 1, it will be noted that the larger portion of the taper of the plug is uppermost, that is, it terminates in proximity to the bonnet opening, as indicated generally by the plug annular shoulder 24. The plug is provided with an upwardly extending annular hub portion 25 which is slotted or grooved at 26 to receive the depending elongated projection or tongue 27 of the actuating stem generally designated 28. Thus, it will be apparent that the stem member is separate from the plug, and, while engaging the latter member, it is prevented from rotating relative to the plug by means of the tongue and groove arrangement as provided through the engagement of the cooperating surfaces 26 and 27 as hereinabove referred to.

The plug 5 is held axially to its seat 4 in the casing by means of the endwise force provided by predetermined positioning of the stem as hereinafter explained, the latter member bearing with its spaced apart projections and in turn against the familiar Belleville or dished spring B received upon the shoulder 32 of the plug. Relieving the lower contact at 29 and 32 allows for line fluid pressure to enter through opening 23 and past the opening 26, thereby to balance the plug against said line pressure. The spring 32 being interposed between the plug shoulder and the end of the stem 28 will allow for slight axial movement of the plug upwardly when lubricant pressure is applied beneath the plug and to the seat surface 4 to force the plug slightly away from said seat surface.

Superposed around the stem 28 is the threadedly adjustable retaining bushing generally designated 31 movably mounted on the casing threads 20 and having on its outer periphery an annular recess constituting the packing chamber 30. By means of radially disposed inwardly extending ports 33, the said chamber communicates with a plurality of radially extending ports 34 of the stem 28. It should be noted that at their outer limits, the ports 34 connect with the annular recess or chamber defined on its periphery by the annular surface 60, whose lower extremity 40 support the sealing means as hereinafter described in more detail. As shown at their central merging location, the diametrically extending ports 34 communicate with the vertically disposed feed duct 35. The latter duct at its upper portion is preferably enlarged as at 36 to receive a packing feed or supply fitting generally designated 37 having a threaded reciprocally movable plunger 38, the usual check valve 39 to inhibit backflow and the open end portion as indicated at 41 in communication with the duct 35. To retain the check valve 39 the transversely disposed pin 42 is positioned as indicated. When it is determined that the adjusting bushing 31 has been properly positioned axially to provide the desired degree or amount of plug retention loading and limiting the axial movement for the tapered plug 5, it is positively held against further rotation by means of a set screw 43 subsequently applied to engage one of a plurality of annularly disposed notches 44 arranged as shown more clearly in FIG. 5. It will be appreciated that in order to provide for a fine degree of axial adjustment of the bushing 31 relative to the plug 5 and the actuating stem 28 that a number of tapped holes, such as those indicated at 45 may be used predeterminately in addition to the original tapping indicated to fixedly receive the set screw 43. The valve stem 28 cooperates in the matter of providing a suitable sealing means between the adjusting bushing 31 and the stem 28 by the annular groove 46, the latter portion at its upper and lower limits being preferably fitted with the upper and lower rings of asbestos packing 47 and 48 respectively. It will be noted that the packing chamber is defined at its outer periphery by the said inner annular surface 60 of the adjustable bushing 31.

At its upper end portion, the valve stem 28 being provided with the packing feed fitting 37 is preferably supplied with flexible plastic sticks of packing, which sticks under the influence of the plunger 38 move from the duct 35 into the radially extending duct 34 and thence into the chamber 46 thereby to provide a further packing and sealing means between the upper and lower asbestos rings 47 and 48 of the said packing. It should also be noted that the packed chamber 46 communicates with the radially extending ducts 33 and thus permits the plastic packing to be moved from the recessed portion 46 outwardly into the annular chamber 30. This arrangement provides not only a suitable sealing member for the stem by means of the packed chamber 46, but also provides suitable sealing for the threads 20 engaging the outer threaded periphery of the bushing 31. All of the foregoing packing movement and sealing application is thus accomplished simultaneously by means of a single pressure feed supply obtained through the introduction member 37 connected to a suitable source of supply.

It will also be noted that as shown more clearly in FIG. 1, the stem 48 is made with a shouldered portion 51 receiving thereon the combined cap and indicator generally designated 52, the latter member being preferably formed with a polygonally shaped opening as indicated at 53. As shown more clearly in the plan view of FIG. 8, the opening 53 receives the square 62 of the stem 28 at 54. The member 52 is preferably held securely to the stem by means of the set screw 55.

Figure 5:
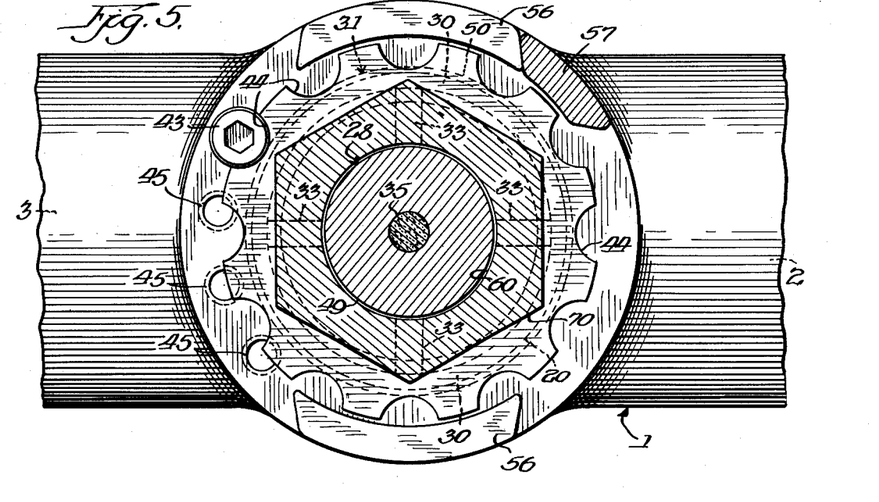
FIG. 5 is a transverse fragmentary sectional assembly view taken on the line 5—5 of FIG. 1.
Figure 6:
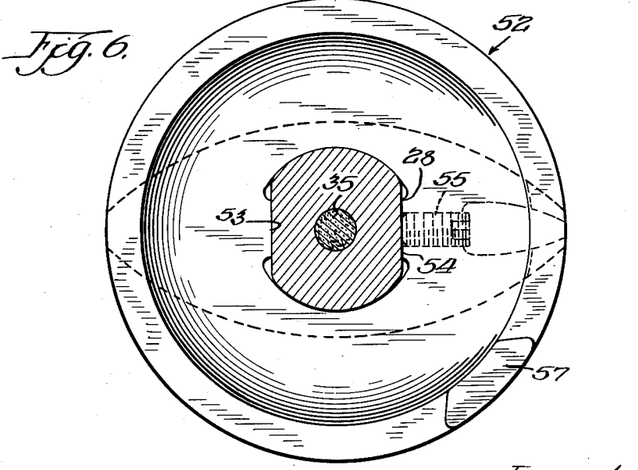
FIG. 6 is a transverse fragmentary sectional assembly view taken on the line 6—6 of FIG. 1.

The hollow underside of the cap 52 shown in FIGS. 5 and 6 receives the bushing hub 70 and is provided with oppositely disposed annularly extending stop lugs 56 which engage a suitable stop 57 on the adjusting bushing 31 thereby to limit the plug rotation to a quarter turn. The plug is accordingly restricted in its rotation by means of said cap which fits snugly over the stem square and engages either side of the said body lug 57 depending on the direction of plug rotation being effected. It will be apparent that the adjusting nut 31 serves also as a bonnet for the valve, and in some of the larger sizes of these valves, the bonnet will be flanged with the adjusting nut being threadedly attached at the bonnet, which arrangement is covered by a separate patent application, identified as Serial No. 848,025, filed Oct. 22, 1959, now Patent No. 3,052,473 granted Sept. 4, 1962.

Figures 7, 8, 9:
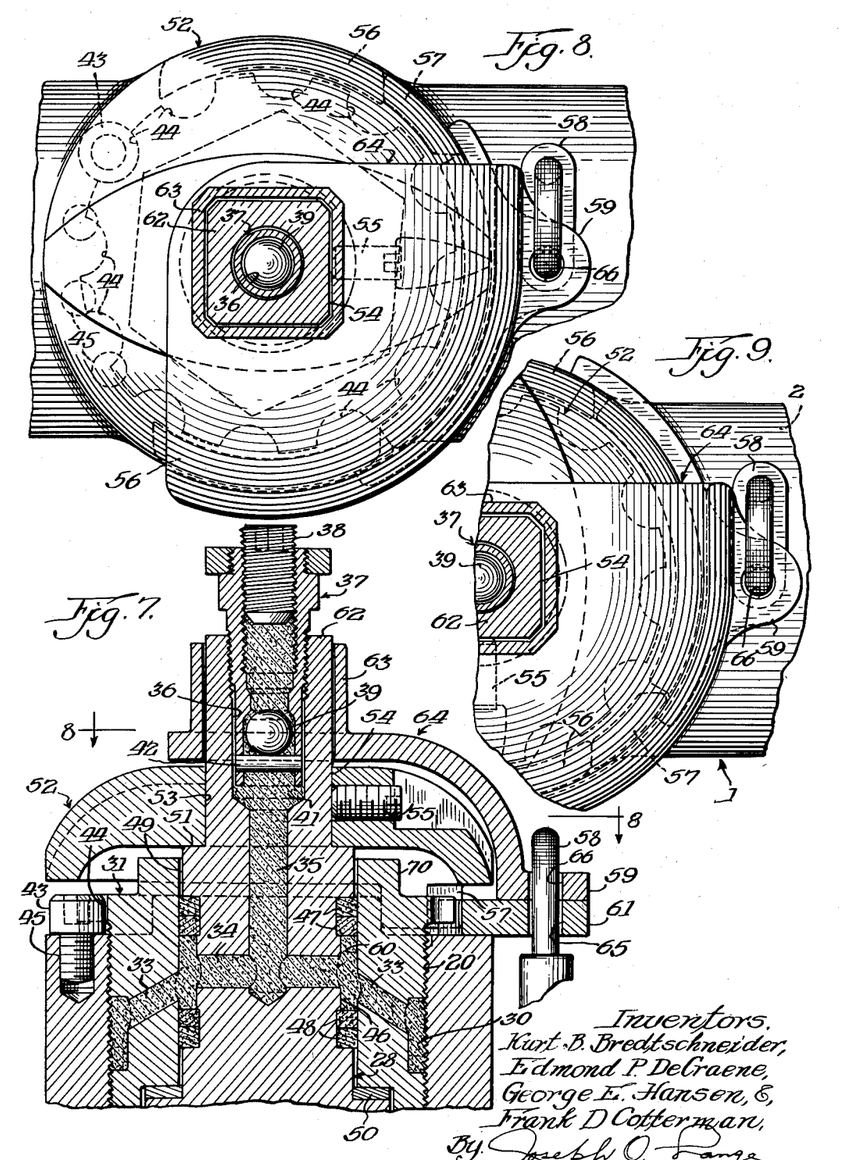
FIG. 7 is a fragmentary sectional view of a modified form of construction employing a padlock locking arrangement to prevent tampering.
FIG. 8 is a fragmentary sectional assembly view of a modified valve taken on the line 8—8 of FIG. 7.
FIG. 9 is a further modified form of locking cover employed.

As shown more clearly in the modified constructions shown in FIGS. 7, 8, and 9, protection of pipe line contents by prevention of tampering may be accomplished by providing the cap 52 with a suitable padlock indicated at 58 and made with an overlying flanged extension as at 59 to engage a similar outwardly extending flange on the adjusting bushing 61 as shown more clearly in FIG. 8. In other structural details, it will be clear that the upper packing distribution, the adjusting bushing and the actuating stem follows the general arrangement of the previously described figures and therefore it is deemed unnecessary to repeat the structural description thereof.

The description has thus far been directed to a construction of combined lubricated and packed plug valves in which separate lubricating means are provided for the valve plug closure as by means of the feed member 13 and also employing a separate or independent packing seal as provided by the packing feed member 37. However, it should also be understood that under certain conditions, it may be desirable to eliminate the separate lubrictaing means and instead connect the plug lubricant ducts and the lower casing chamber 12 with the packing supply and distribution mechanism at the upper end of the body chamber, say by means of a separate vertically extending connecting conduit 62 as shown more clearly in FIG. 10. This construction would preferably be employed only in such cases where a suitable multiple functioning plastic material as hereinafter explained is used, capable of serving not only as a lubricant, but also functioning as an effective packing means whereby the injection of said multi-functioning material at one location, as either at the feed 13 or the feed 37, one or the other, but not both, such specially selected material will seal and lubricate all of the necessary locations in the valve.

Figure 10:
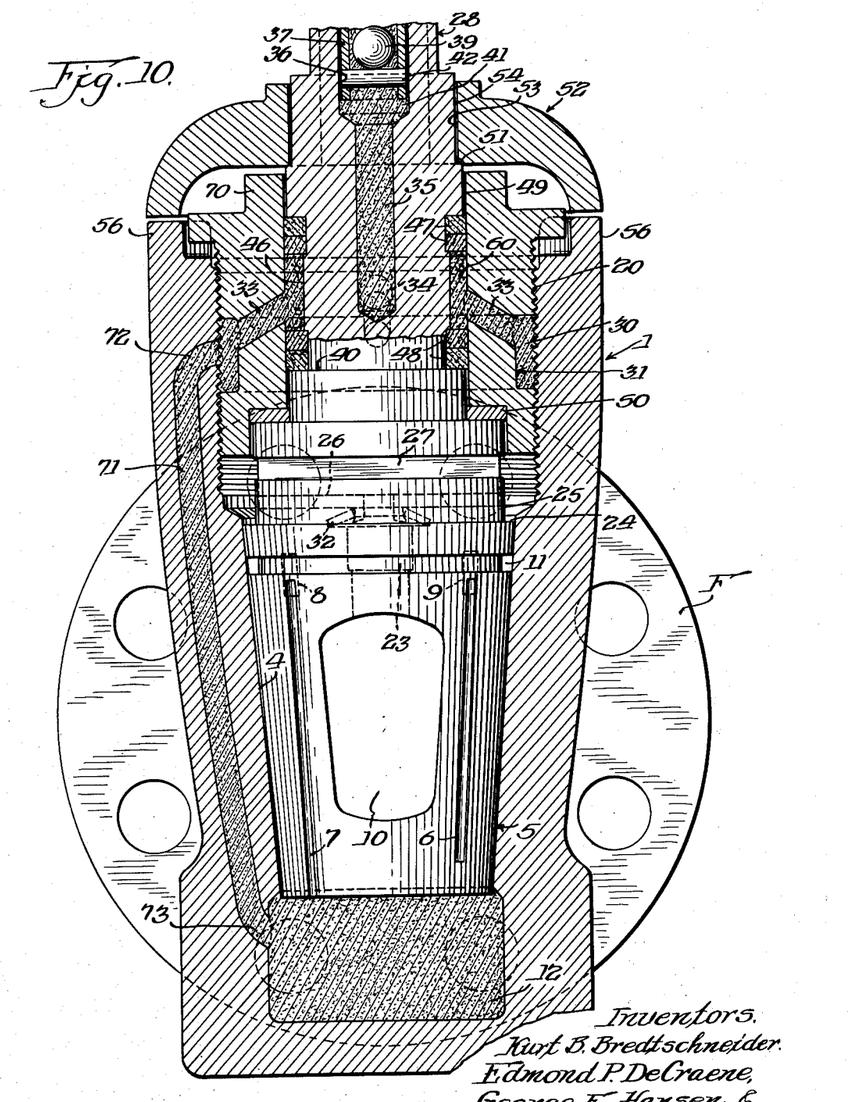
FIG. 10 is a still further modified form of the invention.

Referring now in greater detail to the FIG. 10 modified form, the valve casing generally designated 1 is viewed in this figure in transverse section, that is, at right angles to the normal fluid flow through the valve, and as indicated by plug port 10, the peripheral pipeline connecting end flange F shown in the background. In this modification, the valve plug 4 preferably follows the same structural arrangement insofar as the lubricant ducts are concerned, as illustrated in the previously described figures. Thus, it will be noted that the valve port 10 communicating with casing ports 2 and 3 (shown in FIG. 1) is located on the valve central axis to indicate the latter in the open position. The distinguishing feature of this particular modification resides in making the valve body 1 specially cored substantially vertically and preferably arranged on a side portion thereof as shown at 71 to be supplemented at the upper and lower limits of the said coring, with the annularly inturned or curved extension passages as at 72 and 73 respectively. At the upper portion thereof, the passage or port 72 communicates directly with the annularly extending chamber 30 formed by a suitable recess provided on the outer threaded periphery of the adjusting bushing generally designated 31. In this construction, it will be understood that as described in connection with the other figures, the sealing (and lubricating) packing is supplied to the valve upper annular chambers defined by the respective annular wall surfaces at 46 and 60 through the hollow valve stem 28. The latter member has the central chamber or port 35, which is supplied by means of the usual feed gun as indicated at 41 with a combined lubricant and packing. It should be understood therefore in this construction that not only are said inner and outer stem and bushing annular chambers at 60 and 30 thus suitably packed as indicated, but, as required, packing is easily added. The supply of the packing may thus be continued not only to fill said chamber 30, but also to include the connecting passages 71, 72, and 73. Such flexible arrangement permits the supply of packing also to the lower chamber 12. It will be apparent that this packing feed is conveniently accomplished and the lubricant channels 6, 7, 8, 9, and 11 of the plug (or casing) are easily supplied with the combined lubricant and packing simultaneously, with the fluid seals being effected around the stem 28 at 60 and 46 and also around the bushing threads 20 at 30. The plug channels 7 directly connecting with the casing lower chamber 12 are supplied with the necessary packing lubricant, which moves upwardly through the channel 7 and thence into the body stub recesses 8 and 9 and into the duct 6. It will be apparent that the plug annular channel 11, which may or may not be employed, being connected by stub recess 8 to channel 7 allows for a circumferential distribution of the packing-lubricant around the upper portion of the plug 5, as described in connection with the other figures.

In all other respects, the construction of the adjusting bushing 31 follows the embodiment shown and described in connection with the previous figures. The annular hub 70 on the bushing 31 lengthens the stem bearing 49 by defining the upper limits of the chamber defined at 60, and serve as a substantial bearing for the outer periphery of the stem shouldered portion 51 as at 49 of the actuating stem 28. While not shown in the transverse section of FIG. 10, the bushing 31 is held against rotation by locking screws 43 in the same manner as shown and described in connection with the plan view of FIG. 5. Further, the slotted engagement forming the actuating connection between the valve closure and the stem elongated tongue 27 with the slot or groove 26 of the plug 5 is accomplished in the same manner as previously described in connection with the other figures. The thrust washer 50 which may be of a lubricated metal or siliconized steel absorbs the plug upward axial load as earlier described. It should be apparent that the important contribution made in this modified form is predicated upon the provision that the valve plug 5 and the adjusting bushing 31 may not only be suitably lubricated, but may also be suitably packed simultaneously by one and the same operation when the gun or feed mechanism 37 at the upper end of the stem is operated.

Figure 11:
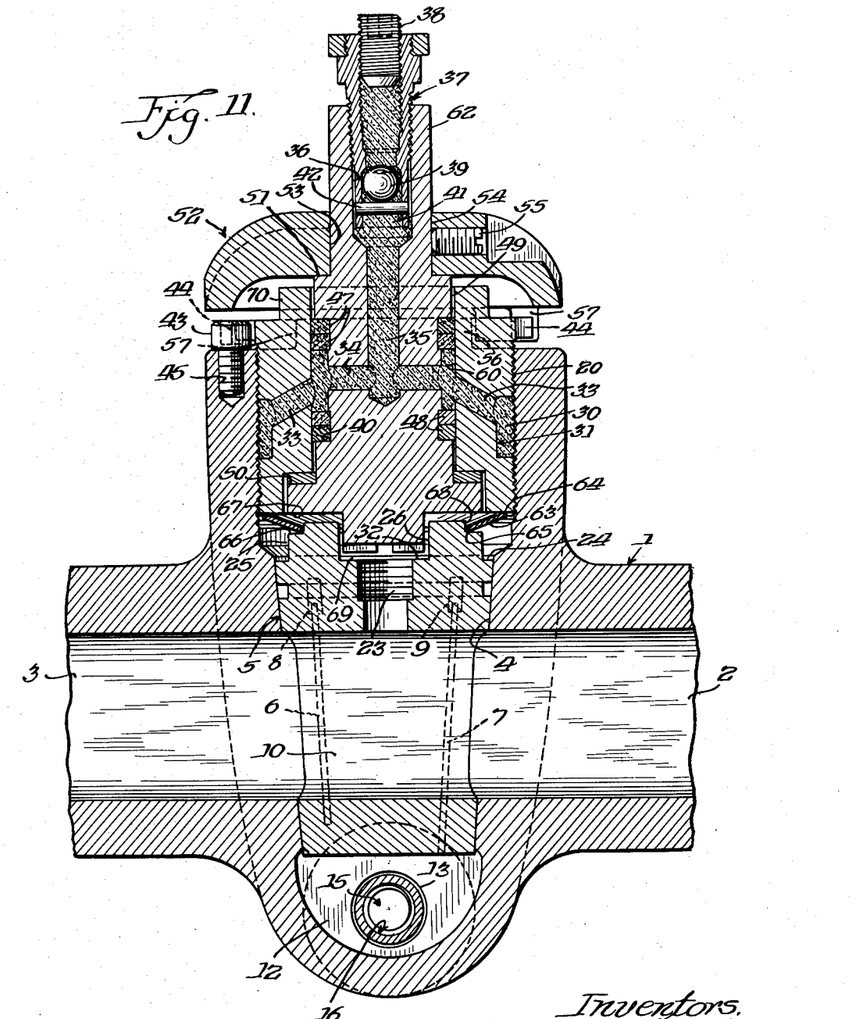
FIGS. 11, 12, and 13 are still further modified forms.

Referring now to FIG. 11, a further modified form is illustrated, in which, as distinguished from FIG. 1, the positioning of the Belleville spring is different insofar as absorbing the upward thrust of the plug is concerned. Here, it is removed to another beneficial position in relation to its assuming the said thrust between the limitedly axially movable plug 5 and the predeterminately fixed adjusting bushing 31.

It should be noted that while illustrated as employing a separate feed mechanism for the packing at the upper portion of the valve and a separate lubricating means for the plug, in the same manner as in FIG. 1, the same type of combined lubricating and packing construction shown and described in FIG. 10 may alternatively be used without affecting the application of this invention.

In FIG. 11, in considering the instant positioning of the spring washer 63, the shoulder 32 provides for a suitable annular space 69 between said shoulder and lower limit of the stem tongue engageable within the recess defined at 26 whereby to rotate the plug. The upper hub portion 25 of the plug is suitably shouldered as at 65 to provide an annular surface 66 upon which the corner portion of the Belleville spring 63 is arranged to bear at its inner apertured limit against the annular surface 68. On its outer portion as at 64, the washer 63 bears against the undersurface 67 of the bushing 31, and, since the Belleville spring follows the usual pattern of being outwardly dished, it thereby provides the desired resiliency between the axially fixed bushing 31 (when the latter member has been finally adjusted) and the upper surface 66 of the plug. It will be understood that this desirable loading of the plug resiliently does not affect the axial positioning of the valve stem 28 in view of the clearance provided at 69. As the plug moves upwardly axially, say, in response to lubricant pressure exerted in chamber 12 or on the annularly tape surface 4, or both, the Belleville spring 63 will resiliently resist predeterminately the said upward movement of the plug 5 due to the axial load imposed upon it by the adjusting bushing 31. It will thus be apparent that insofar as the application of end thrust by the actuating stem shoulder portion against the thrust washer 50 is concerned, there is no adverse effect occasioned since only relatively small axial movement of the balanced plug upwardly takes place. The advantage gained by such arrangement is that the actuating stem will impart only a rotative force to the valve plug 5 when it is turned, and the otherwise objectionably high frictional loads exerted against the actuating stem and its thrust washer 50 are thus avoided.

Since in other respects, the construction in FIG. 11 is similar to that used in connection with the above described figures, it is deemed unnecessary to repeat such description or the method of operation of the valve.

In considering further modified forms, it will be understood that in some cases, it may be desirable in an effort to obtain easier rotatability in the actuating stem and plug to provide for said stem to be mounted in threaded relation to the adjustable bushing. Such construction as an example is shown more clearly in FIG. 12. In this figure, the sectional assembly view thereof is taken on a section extending transversely to the line of flow through the valve similar to that shown and described in FIG. 10. The usual valve elements of the tapered plug 5 and the adjustable bushing 31 are employed in exactly the same relationship described as in connection with FIG. 11. However, in the instant construction, the actuating stem is threadedly journalled as at 75 within the adjusting bushing 31 and thereby allows for threadedly receiving the bushing 31. It will be understood that the threads 75 of the stem and numeral 20 on the casing are of the same lead so that the bushing 31 after being threadedly started on the threads 75 initially will subsequently engage the threads 20 and follow downwardly until the desired load through the Belleville washer 63 has been applied to the plug 5 in its seating in the casing. Thus, the lower projecting tongue portion of the stem moves as measured by the lead and rotation on the threads 75 within the slotted chamber defined by the oppositely disposed surfaces 26. It will be appreciated that when the actuating stem is being assembled with the casing and is moved inwardly its innermost projection will abut against the spring 78 to support the stem and thus prevent the stem undersurface 67 from contacting the upper annular surface 68 of the plug 5. This provision effectively eliminates any friction from such source when the plug is being rotated. It will be appreciated that this method of assembling the stem with the plug is desirable in order to make certain that the stem is in engagement with the groove 26 of the plug when the latter member and stem are rotated in opening or closing the valve. The stem is preferably provided with an annular shoulder as at 79 so that when predeterminately rotated, the stem shoulder 79 will bear against the annular surface 81, thus to prevent the accidental withdrawal of the actuating stem in its rotative movement upon the threads 75.

Figures 12, 13:
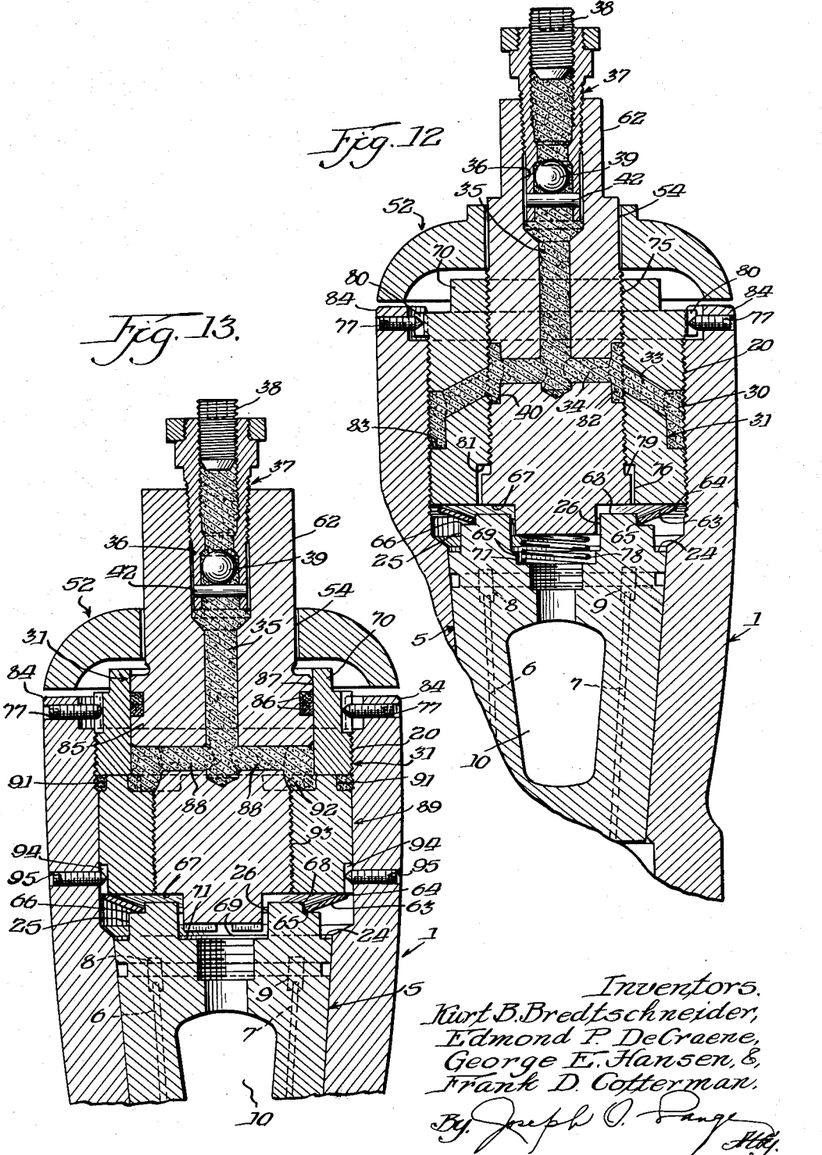

In order to hold the threaded bushing against rotation after it has been adjusted to the desired position axially relative to the plug, the locking screws 77 are provided to bear against the annularly recessed spaced apart portions 80. The screws extend through the spaced oppositely disposed wall portions 84 of the casing 1. The construction otherwise follows the general arrangement of valve elements heretofore described in detail in connection with the other figures, so that the description at this stage will not be repeated.

In a still further modified form, it may be desirable to permit a more effective distribution of the packing insofar as the threads of the bushing 31 are concerned. In such case, the adjusting bushing 31 is preferably made in two pieces, and as shown in FIG. 13, a general assembly of such modification is shown in which it will be noted that the upper stem portion designated 85 is provided with the usual packing rings 86, slidably moving within the annular bore 87 of the bushing 31 as illustrated. At the lower end portion of the upper member 85 of the stem, the transversely extending packing passages are provided at 88. Communicating with an annular chamber 92, the lowermost limits of the chamber are defined by an enlarged annular chamber portion provided by the upwardly projecting lugs 91 arranged in spaced annular relation whereby to provide the packing chamber 92 communicating with the upper radially extending passages 88. The lower half portion of the bushing 31 is mounted in fluid sealing relation as at 91 by reason of its communication directly with the annular chamber 92.

Integrally extending as a threaded extension of the actuating stem, the lower portion threaded as at 93 is provided within the bushing portion 90 internally threaded at 93 to receive the similarly threaded portion of the stem as shown. Actually, it should be understood that the bushing member 89 is assembled onto the stem threads 93 before the stem is placed in the casing 1. In this construction, it will accordingly be apparent that after the said valve stem and the member 89 are assembled to the extent indicated in the drawing, the upper threaded section of the bushing 31 threadedly received at 20 is mounted over the assembly and predeterminately applied in abutting relation against the top limits of the annularly spaced apart lugs 91 to place the desired retaining axial load on the plug through the Belleville washer 63. It is preferably, although not necessarily, held against free rotation in the manner described in connection with FIG. 12. Thus, the engaging set screws 77 project through the upper spaced apart wall portions 84 as shown to provide said engagement. Mounted in similar relation in a lower plane, the combined annularly disposed spaced apart recesses 94 and screws 95 are employed for the lower bushing portion 89 as indicated, so provided on the periphery of the lower portion 89 and having for suitable engagement the rotative and axial positioning screws 95. While a plurality of screws are shown, it is of course appreciated that in most cases a single screw may be sufficient to accomplish the positioning function desired for the slidably receivable bushing lower portion 89. The advantage in the instant modification which is an improvement over the construction described in connection with FIG. 12 lies in a method of separate bushing to reduce the rotative frictional effort or torque required above and below the end limits of the stem packing. The construction also permits of a flexibility insofar as stem operation is concerned which afford the advantage of improved sealing with a fluid sealing connection between the member 89 and the upper threaded portion at 20 by means of the annular seal at 91. The construction possesses the additional benefit in that there is a cooperation with the resilient means provided at the dished shaped washer 63, allowing for the resilient positioning of the plug in predetermined loading within the valve casing on a tapered surface provided on the plug. Here, similarly, the fragmentary sectional view disclosed is taken at a transverse angle to the line of fluid flow as set forth by the flow passage 10. In all other respects, the construction follows the arrangement described in previous figures and therefore the description of the remainder of the parts is intentionally omitted.

It will be appreciated that while a plurality of exemplifications have been shown insofar as a variety of modified forms are concerned, this showing has only been made in an effort to indicate the versatility of the sealing and packing arrangement available as well as the flexibility in valve operation wherein a balanced plug is provided at all times. It is readily apparent that the illustrated apparatus is further adaptable to other changes and modifications perceivable to those skilled in the art. The ease of modification of the illustrated apparatus having been made apparent, it is the desire to be limited only by the scope of the appended claims.

We claim:

1. A lubricated plug valve for use on high pressure fluid lines;
  (a) the combination of a valve casing;
  (b) a ported valve plug rotatably mounted in said casing provided with lubrication means;
  (c) actuating means for rotating said plug;
  (d) an axially adjustable resiliently mounted operating stem separate from and engageable with said plug to effect said rotation of the plug;
  (e) the said stem having an upper end portion projecting outwardly from the said casing;
  (f) resilient means interposed between said stem and plug to support said stem;

(g) the said resilient means being mounted between said stem and plug at the location at which said engagement of the stem with the plug is provided;

(h) an annular threadedly adjustable retaining bushing mounted in a threaded recess of the said casing whereby the axial position of the said stem is set in relation to said plug;

(i) the said bushing enclosing a longitudinal portion of said operating stem within said casing and restraining said stem against substantial axial movement while adjusting the compression load on said resilient means to permit predetermined axial movement of said plug in a direction toward said stem;

(j) annular sealing recess means disposed between a peripheral portion of said operating stem and an inner annular surface of said adjustable bushing;

(k) packing in said annular recess means;

(l) means in an end portion of said stem for injecting the said packing into said annular recess means to urge said packing into sealing engagement with said stem and bushing to prevent leakage of line fluid therepast;

(m) the said injection means for supplying the said packing to the said annular recess means being radially extending and located in said stem whereby to avoid the exertion of a substantial axial force on said valve plug;

(n) a second annular sealing recess means within said casing disposed between said casing threaded recess and the threaded portion of said bushing within said casing recess communicating with said first named annular sealing recess means;

(o) the said packing injection means including a second radially extending means, the latter means being in said bushing and connecting said first and second annular recess means;

(p) means within the casing cooperating with the said packing means and supplementing the said annular recess sealing means for lubricating said valve plug to move the latter member limitedly axially in a direction toward said stem and said resilient means.

2. The subject matter of claim 1;

(a) engaging means selectively positioned on an outer annular portion of said casing;

(b) the said threaded bushing having a plurality of annularly disposed notches for selective cooperation with such casing engaging means whereby to axially adjust and lock said threaded adjustable bushing in desired axial position relative to said stem and said resilient means.

References Cited in the file of this patent

UNITED STATES PATENTS

| | | |
|---|---|---|
| 1,932,322 | Nordstrom | Oct. 24, 1933 |
| 2,068,810 | McCausland | Jan. 26, 1937 |
| 2,139,632 | Flodin | Dec. 6, 1938 |
| 2,235,306 | Atkinson | Mar. 18, 1941 |
| 2,235,307 | Atkinson | Mar. 18, 1941 |
| 2,746,478 | Johnson | May 22, 1956 |
| 2,931,380 | Mueller | Apr. 5, 1960 |